US011099401B2

(12) United States Patent
Olson et al.

(10) Patent No.: US 11,099,401 B2
(45) Date of Patent: Aug. 24, 2021

(54) BIREFRINGENT SPECTRAL DEMULTIPLEXER FOR HYPERSPECTRAL IMAGING

(71) Applicant: THE TRUSTEES OF DARTMOUTH COLLEGE, Hanover, NH (US)

(72) Inventors: Jonathan D. Olson, Hanover, NH (US); Keith D. Paulsen, Hanover, NH (US); David W. Roberts, Lyme, NH (US)

(73) Assignee: THE TRUSTEES OF DARTMOUTH COLLEGE, Hanover, NH (US)

( * ) Notice: Subject to any disclaimer, the term of this patent is extended or adjusted under 35 U.S.C. 154(b) by 113 days.

(21) Appl. No.: 16/443,519

(22) Filed: Jun. 17, 2019

(65) Prior Publication Data

US 2019/0384069 A1 Dec. 19, 2019

Related U.S. Application Data

(60) Provisional application No. 62/685,790, filed on Jun. 15, 2018.

(51) Int. Cl.
*G02B 27/28* (2006.01)
*G02B 5/20* (2006.01)
(Continued)

(52) U.S. Cl.
CPC .......... *G02B 27/285* (2013.01); *G02B 5/201* (2013.01); *H04N 5/2254* (2013.01); *H04N 5/332* (2013.01);
(Continued)

(58) Field of Classification Search
CPC .... G02B 27/285; G02B 5/201; G02B 27/283; H04N 5/2254; H04N 5/332;
(Continued)

(56) References Cited

U.S. PATENT DOCUMENTS 7,649,626 B2 * 1/2010 Harvey ............... G01J 4/04
356/326
2018/0164601 A1 * 6/2018 Nakanishi ............ G02B 27/283

OTHER PUBLICATIONS

Bravo et al. (2017), "Quantitative hyperspectral imaging improves sensitivity to PpIX during fluorescence guided surgery of human brain tumors," Scientific Reports, 7: 9455, pp. 1-13.
(Continued)

*Primary Examiner* — Tony Ko
(74) *Attorney, Agent, or Firm* — Lathrop GPM LLP (57) ABSTRACT

A birefringent spectral demultiplexer for hyperspectral imaging includes N birefringent beamsplitting stages arranged along a light propagation path, to produce $2^N$ mutually divergent output light beams. Each of the output light beams differs from every other one of the output light beams in polarization and/or spectral bandwidth. Each birefringent beamsplitting stage includes a retarder for modifying polarization of each light beam received by the birefringent beamsplitting stage, and a Wollaston prism for splitting each light beam into two orthogonally polarized and divergent light beams. The Wollaston prism has a beamsplitting interface arranged at an oblique angle to the light propagation path. The oblique angle of the beamsplitting interface of each Wollaston prism of the series, except for the first one, is smaller than the oblique angle of the beamsplitting interface of each preceding Wollaston prism. The demultiplexer may be configured to accept input light of any polarization.

12 Claims, 6 Drawing Sheets

(51) Int. Cl.
*H04N 5/225* (2006.01)
*H04N 5/33* (2006.01)
*G02B 27/42* (2006.01)

(52) U.S. Cl.
CPC .......... *G02B 27/42* (2013.01); *G02B 27/4205* (2013.01); *H04N 2005/2255* (2013.01)

(58) Field of Classification Search
CPC ............ H04N 2005/2255; G01J 3/0224; G01J 3/0205; G01J 2003/2826; G01J 3/2823
See application file for complete search history.

(56) References Cited

OTHER PUBLICATIONS

Gorman et al. (2010), "Generalization of the Lyot filter and its application to snapshot spectral imaging," Optics Express 5602, vol. 18, No. 6.

Hagen et al. (2013), Review of snapshot spectral imaging technologies, Optical Engineering, vol. 52(9).

\* cited by examiner

BIREFRINGENT SPECTRAL DEMULTIPLEXER FOR HYPERSPECTRAL IMAGING

CROSS-REFERENCE TO RELATED APPLICATIONS

The present application is a continuation of U.S. Provisional Patent Application Ser. No. 62/685,790 filed Jun. 15, 2018, which is incorporated herein by reference in its entirety.

U.S. GOVERNMENT SUPPORT

This invention was made with government support under contract no. NS052274 awarded by the National Institutes of Health. The government has certain rights in the invention.

BACKGROUND

Hyperspectral imaging is a form of spectrally sensitive imaging that generates a three-dimensional "hyperspectral data cube". The hyperspectral data cube is a set of two-dimensional images, each representing information specific to a different wavelength range. Hyperspectral images may be recorded in a variety of ways, with or without relying on scanning. A spatial-scanning hyperspectral camera scans a scene spatially to sequentially collect the spectral information for each location in the scene. A spectral-scanning hyperspectral camera scans sequentially captures a series of two-dimensional images of the scene, with each image showing only signal from a corresponding wavelength range. In snapshot hyperspectral imaging (also known as non-scanning hyperspectral imaging), the camera simultaneously obtains the spectral information for each location in the scene.

Hyperspectral imaging was originally developed for remote sensing but has, more recently, emerged as a promising imaging modality for medical applications. For example, hyperspectral imaging may be used in intraoperative or diagnostics fluorescence imaging of a patient, and, in some use scenarios, obtain both fluorescence and reflectance image data.

SUMMARY

In an embodiment, a birefringent spectral demultiplexer for hyperspectral imaging includes N birefringent beamsplitting stages arranged in series along a light propagation path to produce $2^N$ mutually divergent output light beams from input light received by a first birefringent beamsplitting stages of the series. N is an integer greater than one. Each of the output light beams differs from every other one of the output light beams in at least one of polarization and spectral bandwidth. Each birefringent beamsplitting stage includes (a) a retarder for modifying polarization of each light beam received by the birefringent beamsplitting stage, and (b) a Wollaston prism, positioned downstream from the retarder, for splitting each light beam into two orthogonally polarized and divergent light beams. The Wollaston prism has a beamsplitting interface arranged at an oblique angle to the light propagation path. The oblique angle of the beamsplitting interface of each Wollaston prism of the series, except for a first one of the series, is smaller than the oblique angle of the beamsplitting interface of each preceding Wollaston prism of the series.

In an embodiment, a method for hyperspectral imaging of input light from a scene includes subjecting the input light, regardless of its polarization, to N successive wavelength- and polarization-dependent stages of beamsplitting, wherein N is an integer greater than one. Each stage of the beamsplitting includes (a) passing incident light, originating from the input light, through a Wollaston prism to divide each light beam of the incident light into two mutually-divergent orthogonally-polarized light beams, and (b) prior to passing the incident light through the Wollaston prism, passing the incident light through a retarder that defines spectral bandwidth of the two mutually-divergent orthogonally-polarized light beams for each light beam of the incident light, such that a last stage of said beamsplitting outputs $2^N$ mutually divergent output light beams. Each of the output light beams differs from every other one of the output light beams in at least one of polarization and spectral bandwidth.

DETAILED DESCRIPTION OF EXAMPLE EMBODIMENTS

Figure 1:
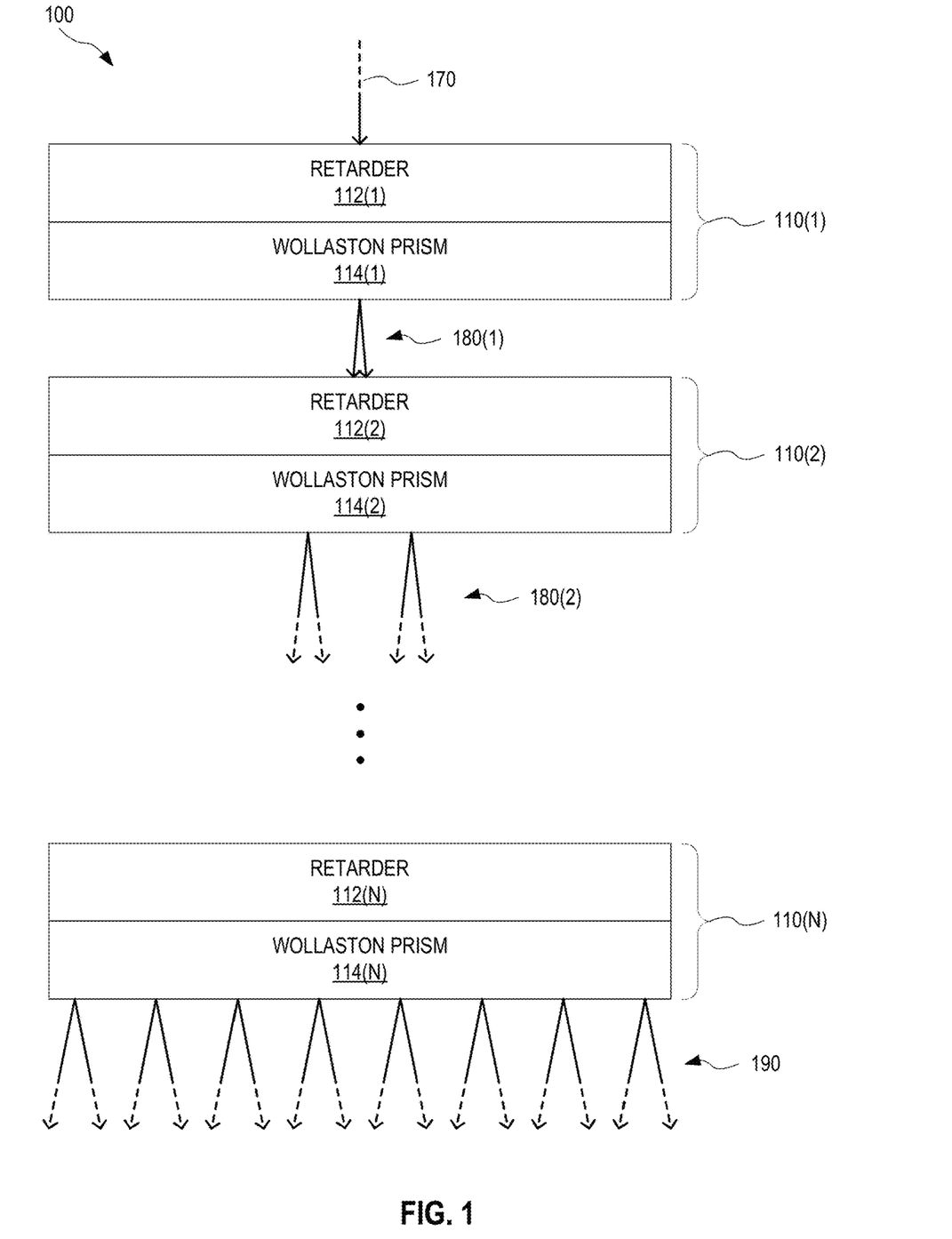
FIG. 1 is a schematic block diagram of one birefringent spectral demultiplexer for hyperspectral imaging, according to an embodiment.

FIG. 1 is a schematic block diagram of one birefringent spectral demultiplexer 100 for hyperspectral imaging. Demultiplexer 100 is configured for snapshot hyperspectral imaging and is capable of recording a hyperspectral data cube very rapidly, for example in less than one second or less than 110 milliseconds. Demultiplexer 100 includes N beamsplitting stages 110 arranged in series along a light propagation path, wherein N is an integer greater than one, for example at least four.

Each beamsplitting stage 110 includes a retarder 112 and a Wollaston prism 114. Retarder 112 and Wollaston prism 114 cooperate to split each light beam, incident on beamsplitter stage 110, into two light beams divergent from each other and of orthogonal polarizations. For example, in the embodiment depicted in FIG. 1, input light 170 is incident on the first beamsplitter stage 110(1) which splits input light 170 into two light beams 180(1) that are mutually divergent and of mutually orthogonal polarizations. Next, the second beamsplitter stage 110(2) splits each of light beams 180(1) into two light beams 180(2) also mutually divergent and of mutually orthogonal polarizations. (It is understood that FIG. 1 does not accurately depict physical light propagation directions.) The last beamsplitting stage 110(N) thus outputs $2^N$ mutually divergent output light beams 190. Thus, embodiments of demultiplexer 100 including two beamsplitter stages 110 produce four output light beams 180, embodiments of demultiplexer 100 including four beamsplitter stages 110 produce sixteen output light beams 180, and embodiments of demultiplexer 100 including six beamsplitter stages 110 produce sixty-four output light beams 180. Each of output light beams 180 differs from every other one of output light beams 180 in at least one of polarization and spectral bandwidth. For example, one half of the $2^N$ output light beams 190 may contain $2^N/2$ different spectral bands for a first polarization direction, while the other half of the $2^N$ output light beams 190 contains the same, or similar, $2^N/2$ spectral bands for a second polarization direction orthogonal to the first polarization direction.

The spectral ranges covered by output light beams 190 may cover a continuous wavelength range, for example the range between 450 and 800 nanometers, or another range in the visible, ultraviolet, and/or infrared ranges.

It is understood that some of light beams 180 and 190 may contain no power, when input light 170 has no power in the corresponding spectral range. In such situations, "light beam" is understood as indicating a channel that may carry actual light when the associated spectral (and polarization components) are present. It is also understood that different light beams may exhibit at least some degree of spatial overlap, and not necessarily define distinct, separated beams. For example, the different light beams may overlap spatially to such an extent as to appear like different spatial elements of a single, wide beam of light.

Figures 2A, 2B:
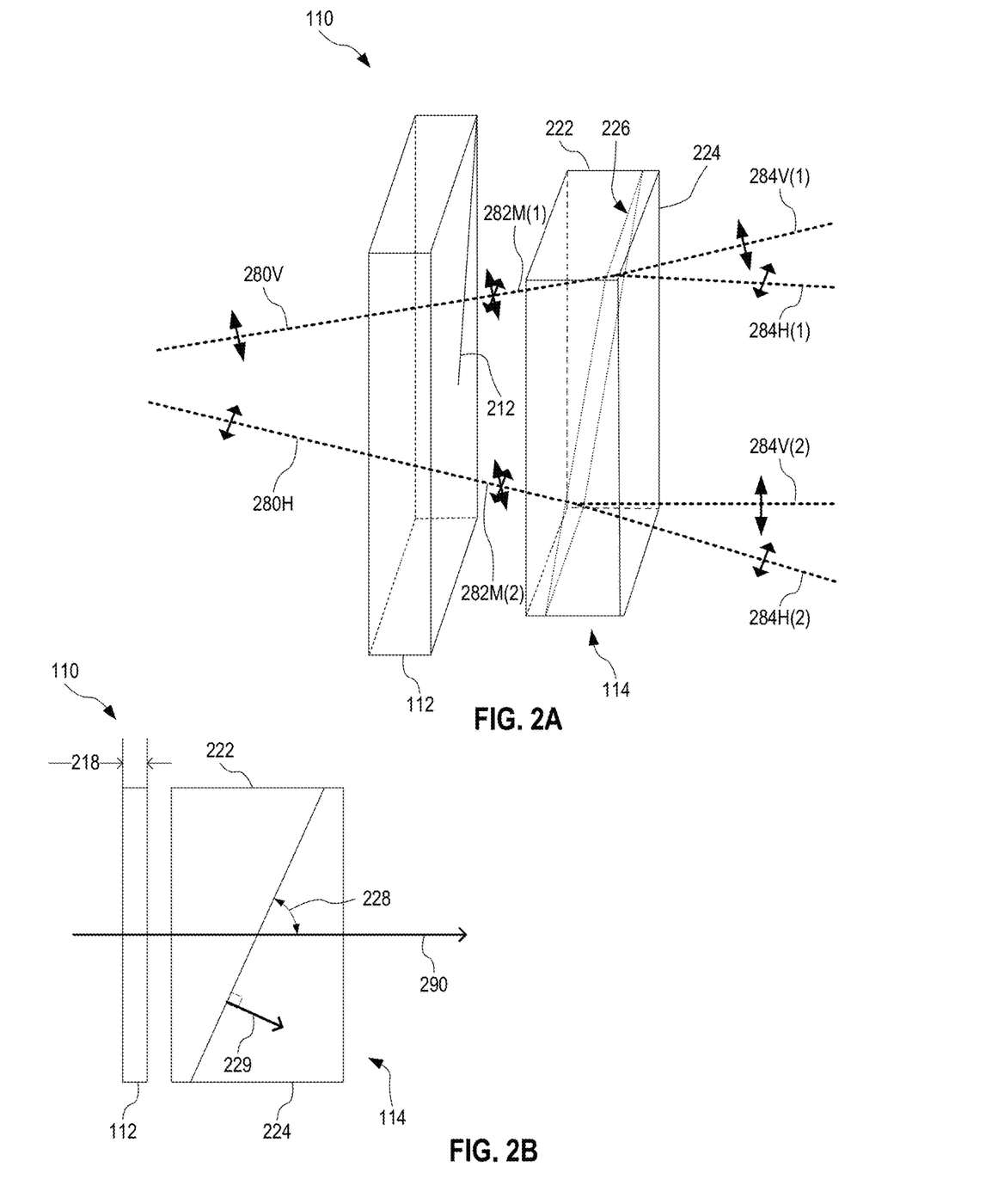
FIGS. 2A and 2B are diagrams of a beamsplitting stage of the demultiplexer of FIG. 1.

FIGS. 2A and 2B are diagrams of beamsplitting stage 110. FIG. 2A shows beamsplitting stage 110 in perspective view, and FIG. 2B shows beamsplitting stage 110 in cross-sectional side view, with the cross section being parallel to the general light propagation path 290 through beamsplitting stage 110.

As will be apparent from the following description, light does not necessarily (if at all) propagate through beamsplitting stage 110 in a direction that is parallel to light propagation path 290, at least because demultiplexer 100 splits input light 170 into a plurality of mutually divergent light beams. However, each of beamsplitting stages 110 of demultiplexer 100 are positioned, for example centered, on light propagation path 290, and the collective propagation direction of the mutually divergent light beams generated in and output by demultiplexer 100 is approximately along light propagation path 290. Light propagation path 290 may be defined by an optical axis of a lens system optically upstream or downstream from demultiplexer 100.

Wollaston prism 114 has two birefringent blocks 222 and 224 contacted to each other at an interface 224. Interface 224 is at an oblique angle 228 to light propagation path 290. Birefringent blocks 222 and 224 have orthogonal optical axes. For example, the optical axis of birefringent block 222 is parallel to the cross section of FIG. 2B and the optical axis of birefringent block 222 is perpendicular to the cross section of FIG. 2B, or vice versa. Wollaston prism 114 may be made of calcite. Wollaston prism 114 splits each light beam, incident thereon, into two mutually divergent light beams of mutually orthogonal polarizations. Interface 224 has a normal vector 229 that, together with light propagation path 290 spans a plane, hereinafter referred to as the "deflection plane". The cross section of FIG. 2B is taken in this plane.

Retarder 112 has a fast axis 212 that is at an oblique angle, e.g., 45 degrees, to the deflection plane of Wollaston prism 114. Thus, retarder 112 ensures that each light beam propagating from retarder 112 to Wollaston prism 114 contains the two polarization components that, in Wollaston prism 114, will be split due to the birefringent properties of Wollaston prism 114.

This is illustrated by example in FIG. 2A, where retarder 112 receives two mutually divergent light beams 280V and 280H. The polarization of light beam 280V is parallel to the deflection plane. The polarization of light beam 280H is perpendicular to the deflection plane. This example corresponds to beamsplitting stage 110 being implemented as beamsplitting stage 110(2) of demultiplexer 100. Retarder 112 modifies the polarization properties of each of light beams 280H and 280V to produce respective intermediate light beams 282M(1) and 282M(2). Each intermediate light beam 282M contains both parallel and perpendicular polarization components, with respect to the deflection plane. Thus, for each intermediate light beam 282M, Wollaston prism 114 separates the two polarization components to produce mutually divergent light beams 284V and 284H. The polarization of light beam 284V is parallel to the deflection plane. The polarization of light beam 284H is perpendicular to the deflection plane.

Thus, beamsplitting stage 110 doubles the number of light beams. The thickness 218 of retarder 112 may be tuned to adjust the spectral properties of beamsplitting imparted by Wollaston prism 114.

Each beamsplitting stage 110 of demultiplexer 100 is configured as may have different properties, e.g., different thicknesses 218 and/or different angles 228, so as to tailor the spectral and polarization properties of each output light beam 190. The overall light transmission properties of light through demultiplexer 100 are also affected by, e.g., angles 228. For example, particularly in embodiments with four or more beamsplitting stages 110, light loss through the sides of demultiplexer 100 (and/or the transverse extent of optical components of demultiplexer 100 and other optical assemblies downstream therefrom) may be minimized when the first beamsplitting stage 110 has the largest angle 228, and each beamsplitting stage 110 after that has a successively smaller angle 228.

Furthermore, we have found that embodiments of demultiplexer 100 with four or more beamsplitting stages 110 benefit from having no or minimal air gaps between the different retarders 112 and Wollaston prisms 114 of demultiplexer 100. Thus, in one embodiment, demultiplexer 100 is configured with an alternating series of retarders 112 and Wollaston prisms 114 directly contacted to each other with no air gap therebetween.

So as to tailor the angle spread of light output of demultiplexer 100 for ultimately being imaged onto a rectangular image sensor (for example with 4:3 or 16:9 aspect ratio), the series of beamsplitting stages 110 may be arranged such that, for each beamsplitting stage 110, the deflection plane of Wollaston prism 114 in each beamsplitting stage 110 is orthogonal to the deflection plane of Wollaston prism 114 in each adjacent beamsplitting stage 110 in the series. For example, in an embodiment of demultiplexer 100 having six beamsplitting stages 110, the deflection planes of beamsplitting stages 110(1,3,5) are coplanar, and the deflection planes of beamsplitting stages 110(2,4,6) are coplanar, but the deflection planes of beamsplitting stages 110(1,3,5) are orthogonal to the deflection planes of beamsplitting stages 110(2,4,6).

When implemented in a hyperspectral imaging system, demultiplexer 100 may be positioned downstream from a collimating lens such that input light 170 is substantially collimated.

Figure 3:
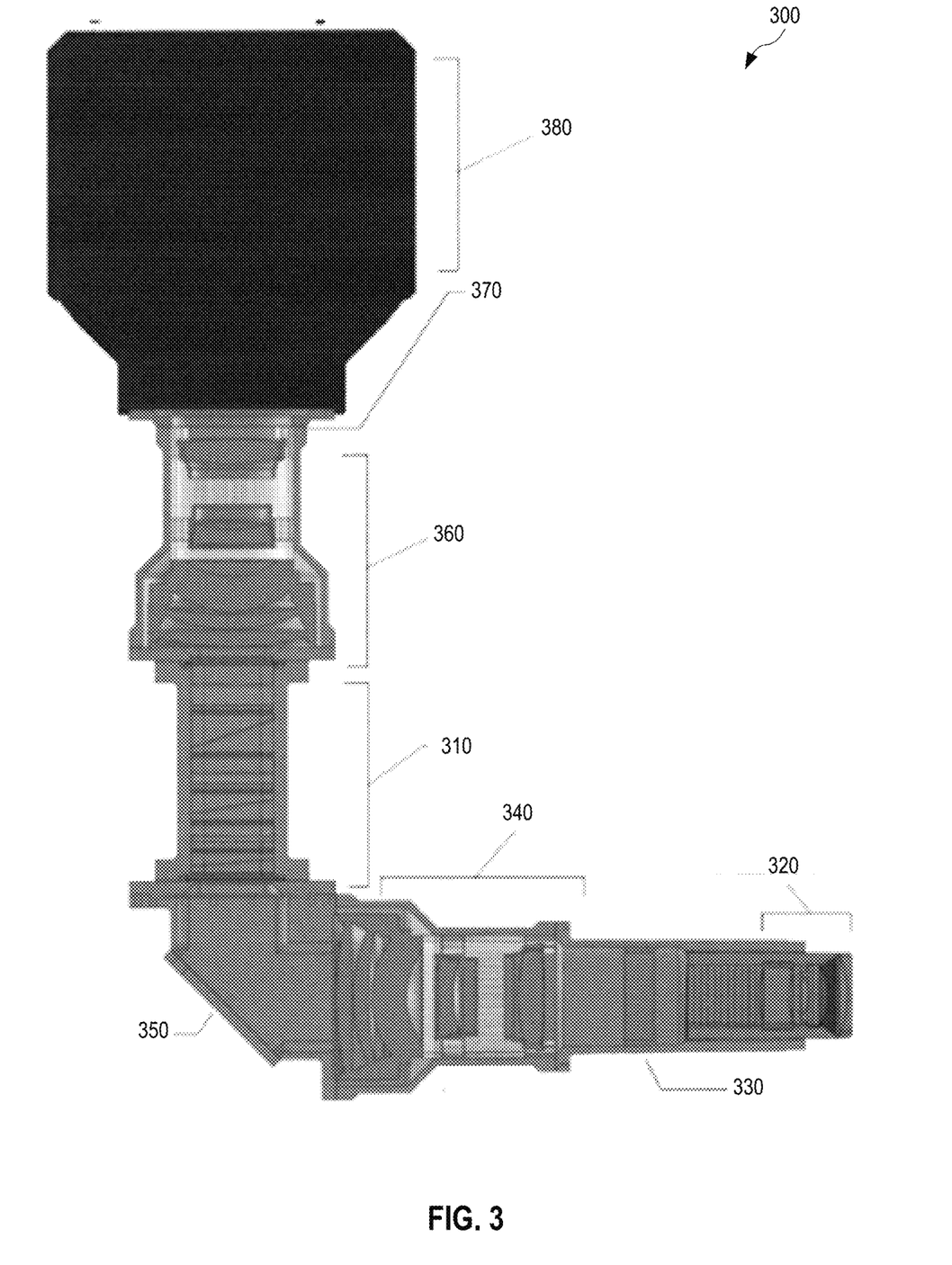
FIG. 3 illustrates a surgical microscope for hyperspectral imaging, according to an embodiment.

FIG. 3 illustrates one surgical microscope 300 for hyperspectral imaging. Surgical microscope 300 includes a birefringent spectral demultiplexer 310, which is an embodiment of demultiplexer 100 implementing six beamsplitting stages 110. Thus, demultiplexer 310 produces 64 different output light beams. Upstream of demultiplexer 310, surgical microscope 300 includes an (a) objective lens 320 for collecting light from an area of interest of a patient (e.g., the patient's brain), (b) an aperture 330 positioned at an image plane of objective lens, (c) a collimating lens 340 for collimating the input light to demultiplexer 310, and (d) a mirror 350 for bending the light propagation path by ninety degrees between collimating lens 340 and demultiplexer 310. Downstream of demultiplexer 310, surgical microscope 300 includes (a) an imaging lens 360 for imaging the plurality of divergent light beams outputted by demultiplexer 310 onto an image plane, (b) an array 370 of wavelength filters for spectrally filtering the output light beams of demultiplexer 310, and (c) a camera 380 with an image sensor positioned at the image plane of imaging lens 360.

Surgical microscope 300 may have a wide field of view (FOV) and thus generate wide-FOV hyperspectral images of the area of interest of the patient, thereby, at least in some scenarios, eliminating the need for moving the FOV of surgical microscope 300 to evaluate the entire area of interest.

In certain embodiments, surgical microscope 300 does not include a polarizer between the patient and demultiplexer 310. In such embodiments, surgical microscope 300 benefits from efficient light collection since all polarizations are accepted. Such embodiments of surgical microscope 300 may also be used for polarization sensitive imaging, where pertinent information about the imaged area of the patient is extracted from the polarization state of light originating from the imaged area.

Figure 4:
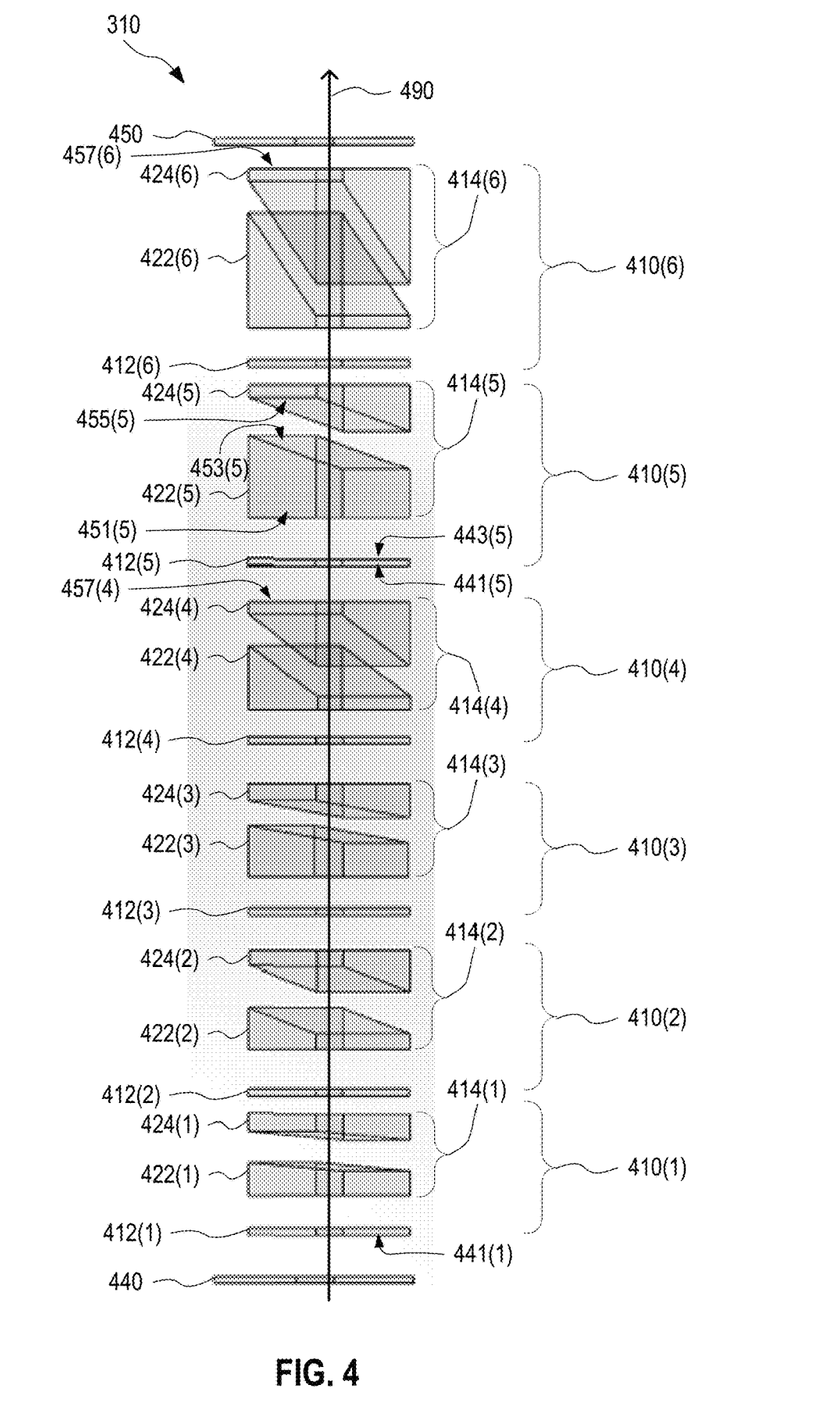
FIG. 4 is an exploded view of a demultiplexer of the surgical microscope of FIG. 3.

FIG. 4 is an exploded view of demultiplexer 310. Demultiplexer 310 includes six beamsplitting stages 410 arranged in series along light propagation path 490. Each beamsplitting stage 410 includes a retarder 412 and a Wollaston prism 414. Each Wollaston prism includes two birefringent blocks 422 and 424. Beamsplitting stage 410 is an embodiment of beamsplitting stage 110. Demultiplexer 310 is configured without any air gaps between successive elements. In each Wollaston prism 414, the two blocks 422 and 424 are contacted directly to each other. Each retarder 412 is contacted to the input face 451 of the following Wollaston prism 414, and each retarder 412, except for the first retarder 412(1) is contacted directly to the output face 457 of the preceding Wollaston prism 414. Contacting may be achieved by bonding or by clamping.

In each Wollaston prism 414, the interface between output face 453 of block 422 and the input face of block 424 is an example of interface 226 and is oriented at an oblique angle 228 to light propagation path 490. The angle 228 decreases from beamsplitting stage 410(1) through the series to beamsplitting stage 410(6) to achieve the corresponding benefits discussed above in reference to demultiplexer 100.

Demultiplexer 310 may further include glass plates 440 and 450. Glass plate 440 is contacted directly to input face 441 of the first retarder 412(1). Glass plate 450 is bonded directly to output face 457 of the last Wollaston prism 414(6).

Figure 5:
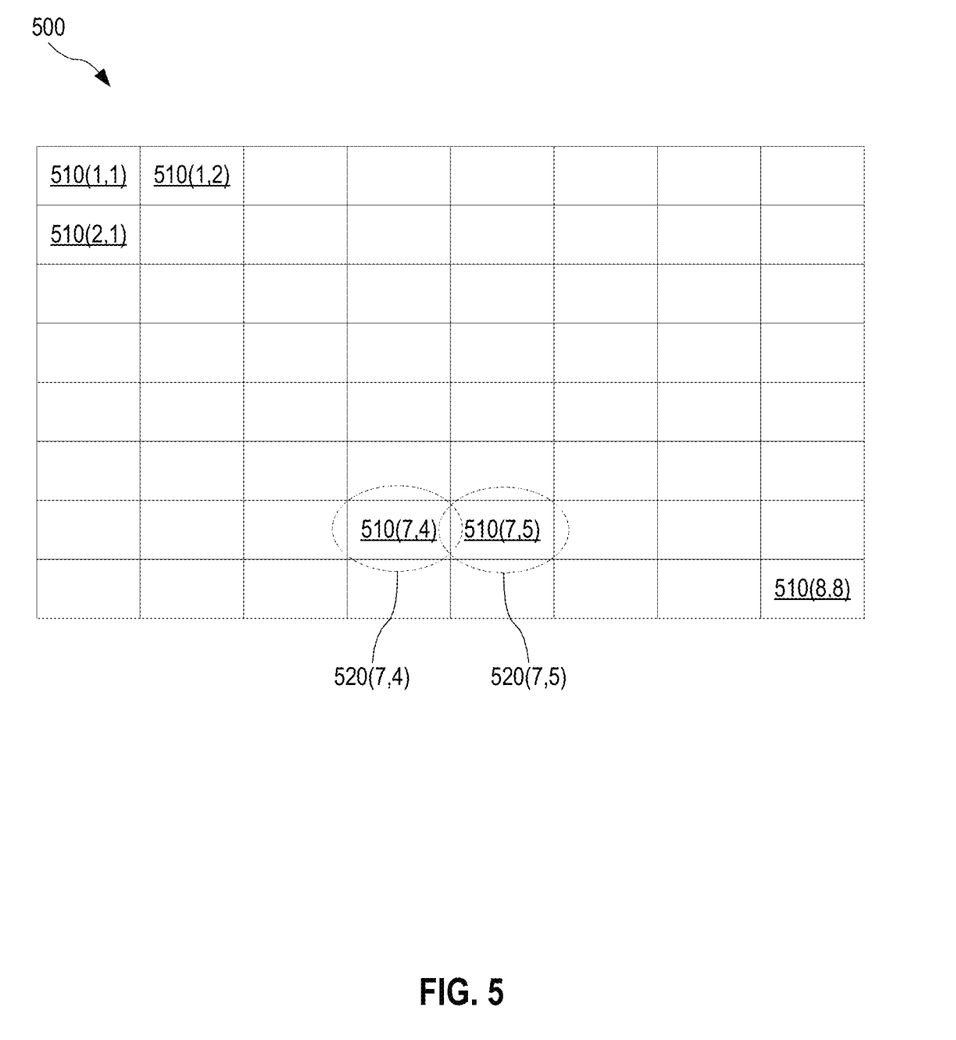
FIG. 5 illustrates a wavelength filter array, according to an embodiment.

FIG. 5 illustrates a wavelength filter array 500 that is an embodiment of array 370 of surgical microscope 300. Array 500 is an 8×8 array of wavelength filters 510. Each filter 510 is configured to further define the spectral bandwidth of a respective one of the 64 output light beams of demultiplexer 310. In one example, at least some of filters 510 serve to reduce spectral overlap between different ones of the 64 output light beams, for example by removing spectral sidelobes from a main peak. It is understood that some spatial overlap between different output light beams may exist, such as depicted by example light beams 520(7,4) and 520(7,5). Filters 510 may help reduce crosstalk between such overlapping light beams.

In one embodiment, array 500 is disposed directly on the image sensor of camera 380.

Without departing from the scope hereof, certain subassemblies of surgical microscope 300 may be provided separately, either for use in other surgical microscopes or for use in other hyperspectral imaging systems. For example, demultiplexer 310 and collimating lens 340 may be provided as a standalone hyperspectral imaging system. Demultiplexer 310 and wavelength filter array 370 (optionally mounted directly on an image sensor) may be provided as a standalone hyperspectral imaging system, which may also include imaging lens 360. Surgical microscope 300 may be provided without mirror 350 and the associated ninety-degree bend of the light propagation path.

Also without departing from the scope hereof, other embodiments of demultiplexer 100 may be provided as a hyperspectral imaging system that further includes (a) an imaging lens (similar to imaging lens 360) for imaging output light beams 190 onto an image plane and (b) an array of wavelength filters (similar to array 500), positioned between the imaging lens and the image plane, for spectrally filtering at least some of output light beams 190.

Figure 6:
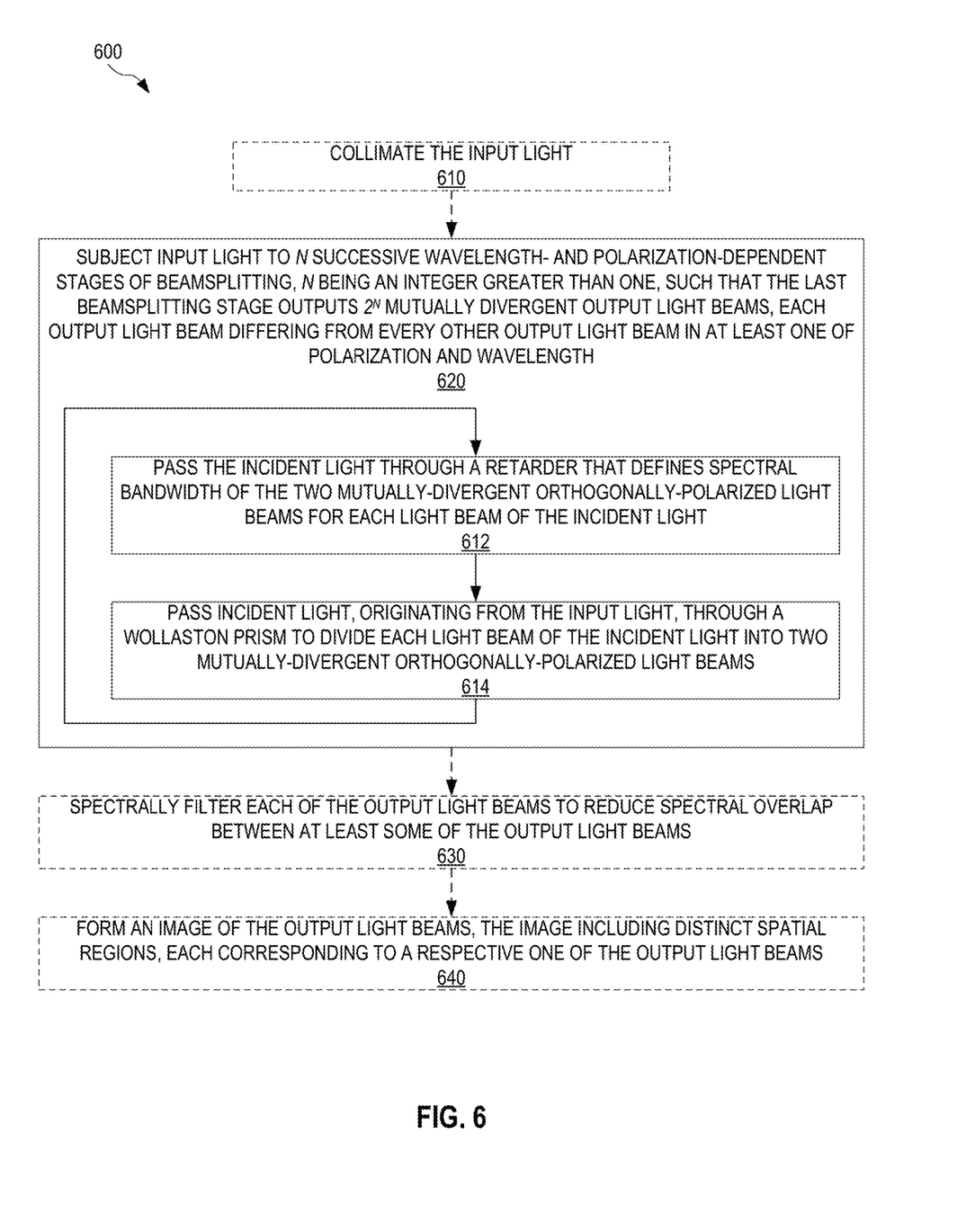
FIG. 6 is a flowchart for a method for hyperspectral imaging of input light from a scene, according to an embodiment.

FIG. 6 is a flowchart for a method 600 for hyperspectral imaging of input light from a scene, e.g., input light 170. Method 600 includes a step 620 that may be performed by demultiplexer 100. Method 600 may further include one or more of steps 610, 630, and 640.

Step 620 subjects input light to N successive wavelength- and polarization-dependent stages of beamsplitting, wherein N is an integer greater than one, such that the last beamsplitting stage outputs $2^N$ mutually divergent output light beams. Each output light beam differs from every other output light beam in at least one of polarization and wavelength.

Step 620 includes sequential steps 612 and 614, which are repeated in an iterative fashion N times. Each iteration of steps 612 and 614 is performed by beamsplitting stage 110, for example. Step 614 passes incident light, originating from the input light, through a Wollaston prism to divide each light beam of the incident light into two mutually-divergent orthogonally-polarized light beams. Step 614 is performed by Wollaston prism 114, for example. In each iteration, step 614 is preceded by step 612 that passes the incident light through a retarder that defines spectral bandwidth of the two mutually-divergent orthogonally-polarized light beams for each light beam of the incident light. Step 612 is performed by retarder 112, for example.

In certain embodiments, step 620 accepts all polarization components of the input light. For example, demultiplexer 100 may be implemented in a hyperspectral imaging system that does not include a polarizer between the scene to be imaged and demultiplexer 100 (as discussed in reference to surgical microscope 300).

Step 610 collimates the input light to step 620. Step 610 is performed by collimating lens 340, for example.

Step 630 spectrally filters each of the output light beams, generated in step 620, to reduce spectral overlap between at least some of the output light beams. Step 630 is for example performed by array 370 or 500, or a similar wavelength filter array adapted to the number of beams generated in step 620.

Step 640 forms an image of the output light beams generated in step 620, optionally after wavelength filtering in step 630. The image includes distinct spatial regions, each corresponding to a respective one of the output light beams.

Step 640 is, for example, performed by imaging lens 360. In embodiments of method 600 that include both step 630 and step 640, each distinct spatial region of step 640 may be filtered by a respective filter in step 630.

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present systems and methods, which, as a matter of language, might be said to fall therebetween.

What is claimed is:

1. A birefringent spectral demultiplexer comprising:
a series of N birefringent beamsplitting stages for splitting one input light beam into $2^N$ mutually divergent output light beams such that each of the output light beams has a unique combination of polarization and spectral bandwidth, N being an integer greater than one, each birefringent beamsplitting stage of the series including:
(a) a retarder for modifying polarization of a light beam received by the birefringent beamsplitting stage; and
(b) a Wollaston prism for splitting the light beam, modified by the retarder, into two orthogonally polarized and divergent light beams, the Wollaston prism having a beamsplitting interface that (i) is arranged at an oblique angle to the light propagation path and (ii) has a normal vector cooperating with the light propagation path to span a plane, wherein, for each Wollaston prism of the series, except for a first one of the series, the plane associated with the Wollaston prism is orthogonal to the plane associated with an immediately preceding Wollaston prism of the series;
wherein the oblique angle of the beamsplitting interface of each Wollaston prism of the series, except for a first one of the series, is smaller than the oblique angle of the beamsplitting interface of each preceding Wollaston prism of the series.

2. The birefringent spectral demultiplexer of claim 1, the series of N birefringent beamsplitting stages including at least four birefringent beamsplitting stages, such that the birefringent spectral demultiplexer outputs at least sixteen mutually divergent output light beams from the input light.

3. The birefringent spectral demultiplexer of claim 1, the series of N birefringent beamsplitting stages being six birefringent beamsplitting stages, such that the birefringent spectral demultiplexer produces 64 mutually divergent output light beams from the input light.

4. The birefringent spectral demultiplexer of claim 3,
for each birefringent beamsplitting stage, output face of the retarder being contacted to input face of the Wollaston prism; and
for each birefringent beamsplitting stage, except for a first one of the series, input face of the retarder being contacted to output face of the Wollaston prism of an immediately preceding birefringent beamsplitting stage of the series.

5. An imaging system, comprising:
the birefringent spectral demultiplexer of claim 1 for producing the output light beams from the input light;
an imaging lens for imaging the output light beams onto an image plane; and
a plurality of wavelength filters, positioned between the imaging lens and the image plane, for spectrally filtering at least some of the output light beams.

6. The imaging system of claim 5, the wavelength filters being arranged in a plane orthogonal to optical axis of the imaging lens.

7. The imaging system of claim 5, further comprising an image sensor, the wavelength filters being disposed on the image sensor.

8. An imaging system, comprising:
the birefringent spectral demultiplexer of claim 1 for producing the output light beams from the input light; and
a collimating lens, positioned upstream from the birefringent spectral demultiplexer, for collimating the input light.

9. A surgical microscope, comprising:
the imaging system of claim 8, further including a mirror between the collimating lens and the birefringent spectral demultiplexer for introducing a ninety-degree bend in the light propagation path;
an objective lens for imaging light from a patient onto an intermediate image plane, the collimating lens being configured to collimate light diverging from the intermediate image plane;
an aperture positioned at the intermediate image plane; and
an imaging lens for imaging the output light beams onto an image plane.

10. A method for imaging of input light from a scene, comprising:
subjecting the input light, regardless of its polarization, to N successive wavelength- and polarization-dependent stages of beamsplitting, N being an integer greater than one, each stage of said beamsplitting including:
(a) passing incident light, originating from the input light, through a Wollaston prism to (i) divide each light beam of the incident light into two mutually-divergent orthogonally-polarized light beams and (ii) deflect different spectral bands of the incident light along a first direction or a second direction that is orthogonal to the first direction, the N successive stages of said beamsplitting alternating between deflection along the first direction and deflection along the second direction, and
(b) prior to passing the incident light through the Wollaston prism, passing the incident light through a retarder that defines spectral bandwidth of the two mutually-divergent orthogonally-polarized light beams for each light beam of the incident light;
such that a last stage of said beamsplitting outputs $2^N$ mutually divergent output light beams, each of the output light beams differing from every other one of the output light beams in at least one of polarization and spectral bandwidth.

11. The method of claim 10, further comprising:
forming an image of the output light beams, the image including distinct spatial regions, each corresponding to a respective one of the output light beams.

12. The method of claim 11, further comprising:
spectrally filtering each of the output light beams to reduce spectral overlap between at least some of the output light beams.

* * * * *